US012384190B2

(12) United States Patent
Geiseler et al.

(10) Patent No.: US 12,384,190 B2
(45) Date of Patent: Aug. 12, 2025

(54) VALUABLE DOCUMENT HAVING A SUBSTRATE ELEMENT AND A FOIL ELEMENT, AND METHOD FOR CLASSIFYING A VALUABLE DOCUMENT

(71) Applicant: GIESECKE+DEVRIENT CURRENCY TECHNOLOGY GMBH, Munich (DE)

(72) Inventors: Henning Geiseler, Munich (DE); Thomas D. Happ, Munich (DE); Thomas Giering, Kirchseeon (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 197 days.

(21) Appl. No.: 18/008,855

(22) PCT Filed: Jun. 2, 2021

(86) PCT No.: PCT/EP2021/025198
§ 371 (c)(1),
(2) Date: Dec. 7, 2022

(87) PCT Pub. No.: WO2021/249671
PCT Pub. Date: Dec. 16, 2021

(65) Prior Publication Data

US 2023/0226841 A1 Jul. 20, 2023

(30) Foreign Application Priority Data

Jun. 10, 2020 (EP) .................................... 20020273

(51) Int. Cl.
*B42D 25/373* (2014.01)
*B42D 25/382* (2014.01)
(Continued)

(52) U.S. Cl.
CPC ......... *B42D 25/373* (2014.10); *B42D 25/382* (2014.10); *G07D 7/1205* (2017.05);
(Continued)

(58) Field of Classification Search
None
See application file for complete search history.

(56) References Cited

U.S. PATENT DOCUMENTS 5,856,048 A 1/1999 Tahara et al.
2021/0213771 A1* 7/2021 Deckenbach .......... G07D 7/205

FOREIGN PATENT DOCUMENTS

EP 1935663 A1 6/2008
JP 2013199063 A 10/2013
WO 2020048640 A1 3/2020

OTHER PUBLICATIONS

International Search Report from PCT Application No. PCT/EP2021/025198, Oct. 4, 2021.

(Continued)

*Primary Examiner* — Hoon K Song
(74) *Attorney, Agent, or Firm* — Workman Nydegger

(57) ABSTRACT

A value document with a carrier element and a foil element arranged in a partial region of the carrier element. The carrier element has, at least in the partial region, a luminescence marker which is adapted to give off luminescence radiation which has at least a first wavelength and a second wavelength in each case in the infrared spectral region. The foil element has a reflection layer and a spectral selection layer. The selection layer is arranged between the carrier element and the reflection layer. The reflection layer is configured to reflect infrared radiation and the selection layer is configured to spectrally selectively inhibit transmission of infrared radiation. The inhibition of the transmission
(Continued)

of the first wavelength and the inhibition of the transmission of the second wavelength differ by at least 10%.

14 Claims, 6 Drawing Sheets

(51) Int. Cl.

| | |
|---|---|
| ***G07D 7/1205*** | (2016.01) |
| ***G07D 7/202*** | (2016.01) |
| *B42D 25/29* | (2014.01) |
| *B42D 25/328* | (2014.01) |
| *B42D 25/351* | (2014.01) |
| *B42D 25/355* | (2014.01) |

(52) U.S. Cl.
CPC ............. *G07D 7/205* (2013.01); *B42D 25/29* (2014.10); *B42D 25/328* (2014.10); *B42D 25/351* (2014.10); *B42D 25/355* (2014.10); *G07D 2207/00* (2013.01)

(56) References Cited

OTHER PUBLICATIONS

Search Report from corresponding European Application No. 20020273. 7, Dec. 1, 2020.

* cited by examiner

VALUABLE DOCUMENT HAVING A SUBSTRATE ELEMENT AND A FOIL ELEMENT, AND METHOD FOR CLASSIFYING A VALUABLE DOCUMENT

BACKGROUND

The invention relates to a value document with a carrier element and a foil element. Furthermore, the invention also relates to a method for classifying a corresponding value document.

It is known to design value documents, in particular bank notes, more forgery-resistant by configuring bank notes with a luminescent security marker or a luminescence marker in or on the paper substrate or polymer substrate.

Furthermore, value documents, in particular bank notes, have, usually in addition to a carrier element, for example a paper substrate or a polymer substrate, a foil element. The foil element is often glued on the carrier element.

However, a growing class of bank note forgeries relates to so-called composed bank note forgeries (composed note) which contain different proportions of authentic bank notes as well as forged proportions, for example photocopied proportions. Here, forgers detach or cut out the foil element, which is usually configured as a level 1 security feature such as a foil strip or a foil patch, from an authentic bank note. Subsequently, the authentic foil element is applied, for example, to a non-authentic carrier element. Further, a non-authentic foil element, for example a photocopy, can be applied to the authentic carrier element to which the authentic foil element was previously applied.

A manipulated bank note with an authentic foil element on a non-authentic carrier element can be recognized as manipulated by known methods by means of proving a luminescence marker in the carrier element. In contrast, for recognizing the manipulation of the second manipulated bank note having a forged foil element on an authentic carrier element, a further safeguarding of the foil element and a corresponding check method with suitable sensor technology is required.

Thus, a conventional luminescence marker in the carrier element may protect composed bank notes only to a limited extent. Accordingly, for identifying both types of composed bank note forgeries, two separate methods can be useful.

SUMMARY

It is the object of the invention to create a solution as to how the forgery resistance of a value document having a carrier element and a foil element can be increased.

This object is achieved according to the invention by a value document as well as a method having the features according to the particular features of the independent claims. Advantageous embodiments of the invention are subject matter of the dependent claims.

A value document according to the invention, in particular a bank note, has a carrier element and a foil element arranged in a partial region of the carrier element. The carrier element has a luminescence marker at least in the partial region. The luminescence marker is adapted to give off luminescence radiation. The luminescence radiation has at least a first wavelength and a second wavelength. The first wavelength and the second wavelength are each configured in the infrared spectral region. The first and the second wavelengths preferably differ by more than 30 nm, more preferably by more than 50 nm, particularly preferably by more than 100 nm. Furthermore, the foil element has a reflection layer and a spectral selection layer. The selection layer is arranged between the carrier element and the reflection layer. In particular, the reflection layer is configured to intentionally reflect infrared radiation. The selection layer is configured to spectrally selectively inhibit transmission of infrared radiation. The inhibition of the transmission of the first wavelength and the inhibition of the transmission of the second wavelength differ by at least 10%, in particular at least 20%, indicated in absolute percentage points.

The invention is based on the finding that with the reflection layer and the spectral selection layer in the foil element a more secure value document can be provided. By the luminescence marker in the carrier element and the selection layer as well as the reflection layer in the foil element there is created a composed security feature, with the aid of which it can be checked whether the combination of carrier element and foil element is authentic.

The present invention improves the recognition reliability of manipulated value documents, for example composed bank notes, by combining the luminescence marker or an IR-luminescent security marker (IR=infrared) on or in the carrier element with the spectral selection layer, in particular an IR absorber with a specific spectral signature, in the foil element, for example a security thread, security strip or security patch.

Furthermore, a more comprehensive identification of manipulated or composed value documents is possible with one single combined method using one single sensor.

The foil element is in particular a security element constructed in layered fashion, e.g. hologram patch, security thread or security strip with micromirrors, microlenses or other optically variable elements, which contains an IR absorber substance.

In particular, the foil element is configured such that the IR absorber does not have to be detected in transmission, as has been customary up to now, this is instead effected indirectly by a measurement of the IR-luminescent luminescence marker in remission geometry from the side of the value document facing away from the foil element. The excitation of the luminescence or of the luminescence feature or the luminescence marker is carried out in particular from the side of the value document facing away from the foil element. The light emitted by the IR-luminescent luminescence marker interacts in particular with the spectral selection layer in the foil element, and is thrown back in particular by the reflection layer in the foil element reflecting or scattering in a spectrally broadband manner, and passes through the carrier element of the value document in order to be, for example, subsequently detected by a detector.

The reflection layer reflecting in a directed manner or diffusely by scattering, throws back, for example, at least 50%, preferably at least 80%, of the incident luminescence light.

The carrier element or bank note substrate can be, for example, a paper substrate, for example made of cotton, a polymer substrate, for example made of BOPP (biaxially oriented polypropylene), or also a hybrid substrate made of a paper core with outer polymer plies (hybrid) or of polymer core with outer paper plies. In particular, the carrier element is translucent to the infrared luminescence radiation, i.e. at least a part of the luminescence radiation impinging on the carrier element or generated in the volume of the carrier element can penetrate the carrier element and emerges from the carrier element at the surface thereof. This can be a directed transmission or the radiation transport can also be effected by corresponding scattering contributions in a diffusive and thus non-direct manner.

Here, the luminescence marker is preferably embedded in the volume of the carrier element during the manufacture of the respective paper or polymer or alternatively is applied to an inner surface in the case of hybrid substrates or to an outer surface. For this, besides the usual printing techniques such as offset printing, intaglio printing, flexographic printing, screen printing or numeric printing, also full-area lacquers or strokes are possible.

The luminescence marker preferably irradiates infrared radiation in the wavelength region from 750 nm to 2500 nm, in particular from 800 nm to 2200 nm.

The construction and properties of the foil element are preferably adjusted to the IR luminescence marker in order to be able to prove via the interaction of the luminescence radiation with the spectral selection layer in the foil element the existence of the same more effectively.

The reflection layer and the selection layer are in particular configured separately, preferably spaced apart.

Preferably, it is provided that the foil element is configured as a security element constructed in layered fashion. Due to the layered construction, the selection layer can be effectively and securely arranged between the reflection layer and the carrier element. The security of the value document is increased.

However, the construction of the foil element can also be significantly more complex and consist of several polymer layers, e.g. several plastic layers (foils), lacquer layers and adhesive layers, and can have several metallic and/or dielectric layers. In particular, some layers can be transparent or translucent or opaque, have different layer thicknesses, consist of different materials, as well as be continuous or partially recessed or printed in the form of patterns or letters. In particular, all the layers between the carrier element and the selection layer and/or between the selection layer and the reflection layer are transparent or translucent to IR light. This means in particular that the reflectivity of the reflection layer of in particular at least 50% at least for the first or the second wavelength is also achieved when measuring from the surface of the foil element facing the carrier element, i.e. preferably through all the layers lying between the carrier element and the reflection layer.

The foil element itself is preferably designed such that the selection layer is located in an interior layer of the foil element, and thus inevitably detaches from the bank note with the foil element when it is removed.

Furthermore, it is preferably provided that the foil element is configured as a hologram and/or security thread and/or security strip. The reflection layer of the foil element can thus have two functions. A first function, for example the visual forgery protection by an iridescent hologram, and a second function, the reflection property for the luminescence radiation. Thus, the value document is again configured more secure.

Furthermore, it is preferably provided that the foil element is configured with at least one optically variable element, in particular a micromirror array and/or a microlens array. An optically variable element is characterized in particular by a viewing angle-dependent or light incidence angle-dependent appearance. The configuration as an optically variable element is advantageous, as optically variable elements often have a reflective metal layer which can now additionally be used as the reflection layer. The optically variable element can also further increase the forgery resistance of the value document.

The reflection layer can have a directed or a diffuse (scattering) reflectivity. For example, the reflection layer may be a metal layer or a metal layer stack, e.g. of Al, or a white ink layer, e.g. $TiO_2$.

Furthermore, it is preferably provided that the foil element is applied, in particular at least partly, to a surface of the carrier element. The foil element is preferably firmly connected to the carrier element. The foil element can, for example, be glued or welded onto the carrier element.

Furthermore, it is preferably provided that the reflection layer and the selection layer are configured to overlap when viewed perpendicularly to the carrier element, in particular perpendicularly to the main extension direction of the carrier element. This means in particular that radiation from the luminescence marker in the partial region, which passes through the selection layer, also impinges on the reflection layer. After reflection, the radiation reflected by the reflection layer reaches in particular again the selection layer and passes through it again.

Furthermore, it is preferably provided that the selection layer is configured as an absorption layer. The absorption layer is in particular configured to absorb at least partly infrared radiation. By absorbing infrared radiation, the intensity of this radiation can be inhibited. In particular, the absorption layer is configured to absorb at least the first wavelength and/or the second wavelength or to reduce the respective intensities of the wavelengths. Preferably, the absorption layer is configured to absorb or inhibit the intensities of the wavelengths to different extents. Furthermore, the absorption layer can be configured to inhibit incident radiation only in a part of the incident spectrum, the selection spectral region. Compared to a reflective selection layer, an absorption layer preferably has a simpler construction and is therefore easier and cheaper to integrate into a foil element.

In one embodiment, the selection layer may be configured as a spectrally selectively reflective selection layer. This allows the first wavelength to be reflected by the selection layer and the second wavelength to penetrate the selection layer. In this case, the reflection layer is preferably configured as a broadband-absorbing layer. In this case, it is also possible that a further broadband-absorbing layer is arranged between the selection layer and the reflection layer.

Furthermore, it is preferably provided that the reflection layer has a reflection spectral region and the selection layer has a selection spectral region, the reflection spectral region being more broadband than the selection spectral region. By the reflection layer, there is thus reflected a more broadband region of the infrared radiation of the luminescence marker than is inhibited by the selection layer. Due to the broader reflection spectral region, the reflection layer can simultaneously be utilized for visual effects of the foil element in the visible spectral region.

Furthermore, it is preferably provided that the reflection layer is adapted to reflect at least 50%, preferably at least 80%, of a luminescence radiation irradiated by the luminescence marker and incident on the reflection layer. Through this reflection property, reflected luminescence radiation can then be detected to form a clearer spectral signature. Thus, the value document is configured more secure.

Furthermore, it is preferably provided that the luminescence marker is embedded in the carrier element. The luminescence marker or the luminophor can already be introduced into the carrier element during its manufacture. For example in the case of a carrier element configured as a paper, the luminescence marker can be introduced in the paper. This is advantageous because the luminescence marker is thus undetachably connected to the carrier element and the value document is configured more secure.

Supplementary or alternatively, the luminescence marker may also be applied to a surface of the carrier element. The luminescence marker may be arranged on the side of the carrier element facing away from the foil element, so that the luminescence radiation falls through the carrier element onto the foil element, in particular the selection layer and the reflection layer. However, the luminescence marker may also be arranged on the side facing the foil element, in particular between the carrier element and the foil element.

In particular, the value document has, as a luminescence marker, a plurality of luminescence marker particles. Preferably, the luminescence marker particles are distributed, in particular completely, in the carrier element or over the carrier element.

Furthermore, it is preferably provided that the value document has a document class-specific spectral signature which is dependent on a luminescence radiation irradiated by the luminescence marker and incident on the selection layer, and in particular on the reflection layer. In particular, the spectral signature is formed from intensity values of several different infrared spectral regions. Preferably, the different spectral regions are filtered or inhibited differently by the selection layer, resulting in the spectral signature. By means of the spectral signature, the value document and value documents of identical construction can be assigned to a common class and be separated from value documents of a different constructional type.

In one embodiment, the reflection layer can be configured to reflect diffusely in a broadband manner. Furthermore, the selection layer element can be configured as an absorptive edge filter. In particular, the foil element may be configured with a visual feature comprising a microlens array with an underlying diffusely reflective, optionally printed, white ink layer. The white ink layer can serve as a reflection layer.

The invention also relates to a method. In the method according to the invention, a value document with a carrier element having a luminescence marker and a foil element with a reflection layer arranged in a partial region of the carrier element is classified. The following steps are performed:

a) exciting the luminescence marker with radiation, in particular infrared radiation, from an excitation side of the value document, the excitation side being the side of the value document facing away from the foil element;
b) capturing an intensity of the luminescence radiation irradiated by the excited luminescence marker and reflected by the reflection layer, the capturing being carried out in particular from the side facing away from the foil element;
b1) in particular determining a spectral signature based on the captured intensity;
c) comparing the captured intensity, in particular the determined spectral signature, with a reference intensity, in particular a spectral reference signature; and
d) classifying the value document based on the comparison.

It was surprisingly found that the capture of the intensity of the luminescence radiation which is reflected by the reflection layer, in particular on the side of the carrier element facing away from the foil element, leads to a more forgery-resistant spectral signature or combination signal curve than a direct capture of the luminescence radiation alone which is effected without the diversion via the reflection layer.

Preferably, it is provided that the luminescence radiation irradiated by the excited luminescence marker is spectrally inhibited or filtered by a selection layer of the foil element before the capture in step b). The selection layer is preferably configured as an absorption layer. With the selection layer, at least a spectral proportion of the luminescent light impinging on the selection layer is inhibited from penetrating the selection layer, i.e. at most only a part of the intensities of the inhibited wavelengths reaches the reflection layer. With the selection layer, a distinct spectral signature or combination signal curve can be generated. The value document can thus be classified more securely and the presence and authenticity of the foil element can be proven.

Furthermore, it is preferably provided that the luminescence radiation irradiated by the excited luminescence marker first impinges on the selection layer and only then the reflection layer. After impinging on the reflection layer, the radiation reflected by the reflection layer may pass through the selection layer again before being captured. Accordingly, the selection layer is arranged in particular between the carrier element and the reflection layer.

Furthermore, it is preferably provided that, as the captured intensity, at least a first intensity of a first wavelength and a second intensity of a second wavelength, each in the infrared spectral region, are captured. Due to the at least two captured wavelengths, the spectral signature can be configured with a higher information content, thereby allowing the value document to be configured more secure.

Furthermore, it is preferably provided that a direct luminescence intensity of the luminescence marker is captured on the direct way of propagation outside the partial region, in particular within a further partial region different from the partial region, and in step d) the classification is performed based on the direct luminescence intensity and the intensity captured in step b). The direct luminescence intensity is captured directly, i.e. without having been reflected by the reflection layer.

Furthermore, it is preferably provided that the reference intensity is made available by a direct luminescence intensity of the luminescence marker captured outside the partial region and on the direct way of propagation.

The further partial region in particular also comprises the luminescence marker, but is arranged outside the region of overlap with the foil element. In particular, the foil element is only present in the partial region and not in the further partial region.

It is then preferably provided that the captured intensity of the further partial region is compared with the captured intensity of the partial region. In other words, the intensity which is captured from a luminescence marker outside the partial region is compared with the intensity which is captured from a luminescence marker inside the partial region. The intensity of the further partial region or outside the partial region can be utilized or made available as reference intensity. The utilization of the intensity of the further partial region as a reference intensity is also called self-reference.

Furthermore, it is preferably provided that the combination intensity captured in step b) comprises luminescence radiation which is radiated from the excited luminescence marker in the direction of the foil element, thereafter is spectrally inhibited in the spectral selection layer of the foil element, thereafter is reflected by the reflection layer and thereafter is spectrally inhibited again by the spectral selection layer.

The preferred embodiments presented with regard to the method according to the invention and their advantages apply accordingly to the value document according to the invention. The physical components of the value document according to the invention are configured to carry out the respective steps of the method.

Further features of the invention may be found in the claims, in the figures and the description of the figures.

BRIEF DESCRIPTION OF THE DRAWINGS

Embodiment examples of the invention will hereinafter be discussed more closely with reference to a schematic drawing.

There are shown.

DETAILED DESCRIPTION OF VARIOUS EMBODIMENTS

In the figures, identical or functionally identical elements have the same reference signs.

Figure 1:
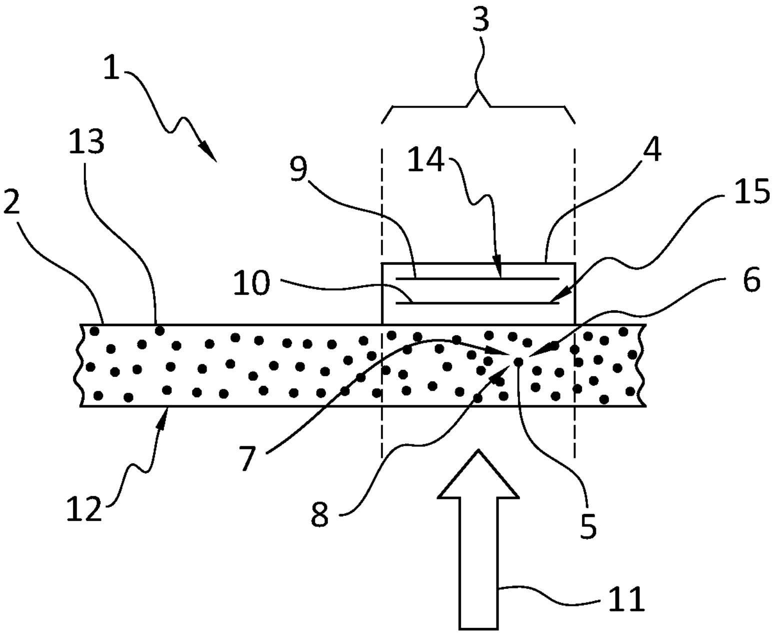
FIG. 1 a schematic diagram of an embodiment example of a value document according to the invention with a carrier element and a foil element, the carrier element having a luminescence marker.

FIG. 1 schematically shows an embodiment example of a value document 1. The value document 1 has a carrier element 2. The carrier element 2 in turn has a partial region 3.

In the partial region 3, a foil element 4 is arranged. Furthermore, the carrier element 2 has a luminescence marker 5 in the partial region 3. In particular, the luminescence marker 5 is configured as a plurality of particles, preferably in powder form.

The luminescence marker 5 is configured to give off luminescence radiation 6. The luminescence radiation 6 has at least a first wavelength 7 in the infrared spectral region and a second wavelength 8 in the infrared spectral region.

The luminescent substance used for the luminescent security marker or luminescence marker 5 can be, for example, organic, metalorganic or inorganic luminescent substances. The excitation of the luminescent substances is preferably in the visible or infrared spectral region. Particularly suitable are luminescent substances in which both excitation and emission are in the infrared spectral region, since here particularly low scattering losses and thus particularly high intensities occur in the backside measurement through the carrier element 2.

Examples of such luminescent substances are inorganic pigments doped with one or several rare earth elements, in particular with the dopants neodymium or ytterbium or erbium or thulium or holmium, or doped with certain transition metals. The combination of ytterbium with a further dopant, in particular erbium, thulium, neodymium or holmium, is preferred. Furthermore, metalorganic complexes, in particular with neodymium or holmium or erbium or thulium or ytterbium, or certain organic substances can be employed.

As luminescence marker 5, one single luminescent substance or a mixture or combination of several luminescent substances can be employed. In the latter case, the first and the second wavelength of luminescence emission may be emitted from the same luminescent substance or from different luminescent substances of the luminescence marker 5.

In addition to the luminescence marker 5, the value document 1 may comprise further feature substances which increase the forgery resistance, for example further luminescent substances. It is also possible to combine several luminescence markers 5 with different spectral signatures in the value document 1. For example, the luminescence marker 5 may be present as a mixture with the further feature substance, or the luminescence marker 5 and the further feature substance may be present at different locations of the value document 1, for example in the volume or on one or both surfaces of the value document 1.

The first wavelength 7 can be 1100 nm, for example. The second wavelength 8 can be 1600 nm, for example.

According to the embodiment example, the foil element 4 has a reflection layer 9 and a spectral selection layer 10. The selection layer 10 is here arranged between the carrier element 2 and the reflection layer 9. According to the embodiment example, the reflection layer 9 and the selection layer 10 are arranged parallel to each other.

The reflection layer 9 is configured to reflect infrared radiation, in particular the luminescence radiation 6.

The selection layer 10 is configured to spectrally selectively inhibit transmission of infrared radiation, in particular the luminescence radiation 6. The inhibition of transmission by the selection layer 10 at the first wavelength 7 is at least 10% more or less than the inhibition of transmission of the second wavelength 8, expressed in absolute percentage points. If the transmission through the selection layer 10 at the first wavelength 7 is for example 50%, the transmission through the selection layer 10 at the second wavelength 8 is preferably either at least 60% or at most 40%.

Preferably, the selection layer 10 is configured as a spectrally selective absorption layer. This means that the absorbing selection layer 10 absorbs at least partly certain wavelengths or wavelength regions. In particular, the selection layer 10 has an IR absorber.

For the IR absorber in the selection layer, for example inorganic, metalorganic or organic pigments or dyes are employed. Preferably, the absorber layer is printed on during the manufacture of the foil element. The IR absorber is then present in particular in the form of pigment particles or a dye embedded in a printing ink. Suitable inorganic pigments can be, for example, oxides, halides, phosphates, chalcogenides, vanadates, silicates or germanates of transition metals (e.g. Zn, Ti, V, Cr, Mn, Fe, Co, Ni, Cu) or rare earth elements (e.g. Ce, Pr, Nd, Sm, Eu, Tb, Dy, Ho, Er, Tm, Yb). Suitable metalorganic compounds are e.g. phthalocyanines or naphthalocyanines. Suitable organic compounds are e.g. Cu H2Pc or porphyrins.

The construction of the value document 1 enables a measurement 11 in remission geometry. For this purpose, according to the embodiment example, the luminescence marker 5 is excited, for example by irradiation with light, in particular infrared light. The irradiation is effected in particular from a side 12 of the carrier element 2 facing away from the foil element 4.

The luminescence marker 5 gives off luminescence radiation 6 due to the excitation. The luminescence radiation 6 in turn propagates in the carrier element 2 and impinges at least partly on the selection layer 10. Only a part of the spectrum is allowed to pass through the selection layer 10 unhindered, or it may even be that the complete spectral region of the luminescence radiation 6 is inhibited, preferably to varying degrees with regard to intensity. The luminescence radiation 6, which has penetrated the selection layer 10 or emerges on the side of the selection layer 10 facing away from the carrier element 2, therefore has in particular a different spectral signature than before entering the selection layer 10.

The luminescence radiation, which is at least partly inhibited by the selection layer 10 or altered with regard to spectral intensities, now impinges on the reflection layer 9. The luminescence radiation 6 is reflected at least partly by the reflection layer 9 and at least partly passes through the selection layer 10 again. After passing through the selection layer 10, the luminescence radiation 6 passes through the carrier element 2 and can then be detected on the side 12 of the carrier element 2 facing away from the foil element 4. For detection, for example, a detector is arranged on the side 12 facing away.

It is possible that during the detection of the reflected luminescence signal or the reflected luminescence radiation 6 not only reflected luminescence radiation is captured, but in combined manner also a portion of directly radiated luminescence radiation.

According to the embodiment example, the foil element 4 is configured as a security element constructed in layered fashion. The security element is characterized in that it is difficult to reproduce without special manufacturing equipment and special manufacturing knowledge. Preferably, the foil element is configured as a hologram and/or security thread and/or security strip.

According to the embodiment example, the foil element 4 is arranged on a surface 13.

According to the embodiment example, the reflection layer 9 and the selection layer 10 are configured to overlap at least in certain regions when viewed perpendicularly to the carrier element 2. For example, the reflection layer 9 and the selection layer 10 are configured to overlap completely. For example, the reflection layer 9 and the selection layer 10 are configured on top of each other in exact register.

The reflection layer 9 has a reflection spectral region 14. The selection layer 10 has a selection spectral region 15. According to the embodiment example, the reflection spectral region 14 is configured to have more broadband than the selection spectral region 15. This means that the reflection spectral region 14 or the reflection layer 9 reflects a larger wavelength region than the selection spectral region 15 or the selection layer 10 inhibits. This is advantageous because it also allows broadband-reflective metal layers to be employed for the reflection layer, which can simultaneously make available other functions of the foil element, e.g. a reflection hologram.

Figure 2:
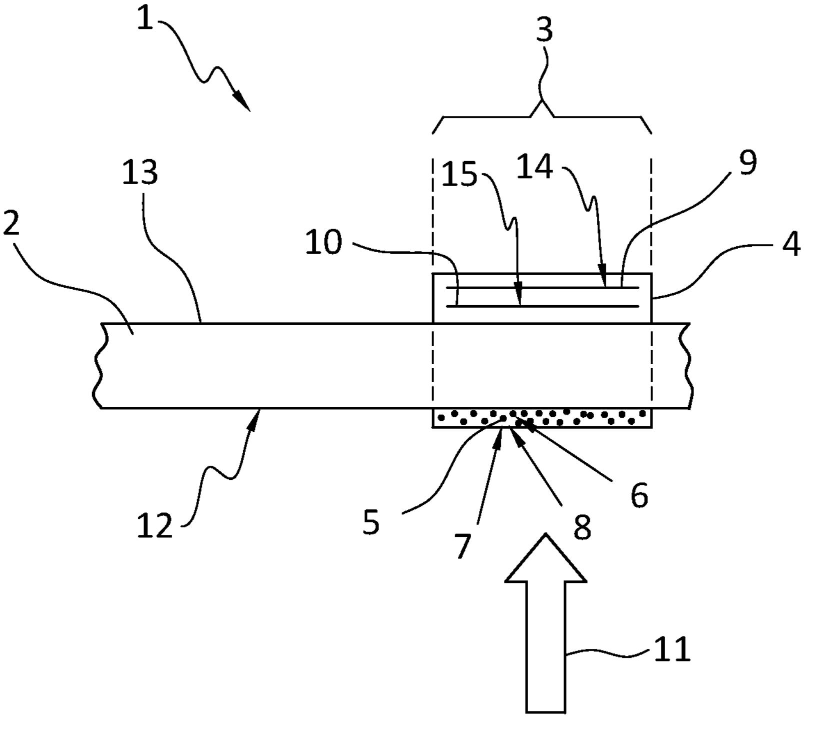
FIG. 2 a schematic diagram of a further embodiment example of the value document, the luminescence marker being arranged on the side of the carrier element facing away from the foil element.

FIG. 2 shows the value document 1 analogous to FIG. 1, but according to this embodiment example the luminescence marker 5 is arranged on the opposite side 12 of the carrier element 2. For example, the luminescence marker 5 can be printed on or applied as a backside coating to the carrier element 2.

Supplementary, the luminescence marker 5 can also be embedded in the carrier element 2 as shown in FIG. 1.

Figure 3:
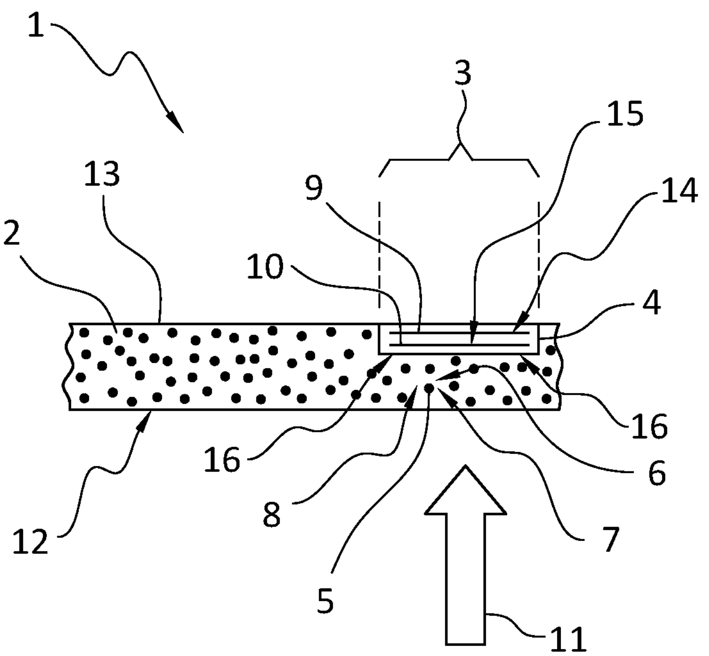
FIG. 3 a schematic diagram of a further embodiment example of the value document, the foil element being embedded in the carrier element.

FIG. 3 shows the value document 1 also analogous to FIG. 1. However, according to the embodiment example of FIG. 3, the foil element 4 is embedded in the carrier element 2. This means, for example, that there is a recess 16 in the carrier element 2 in which the foil element 4 is incorporated or embedded or integrated. It is possible that the foil element 4 is worked into the carrier element 2 during manufacture of the carrier element. For example, the foil element 4 can be surrounded by the carrier element 2 merely on some sides or it can be completely surrounded by the carrier element 2 on all sides. This is particularly the case when the foil element 4 is designed as a fully embedded security thread or as a security thread partly embedded only in some regions of a so-called window thread.

The luminescence marker 5 is arranged in the carrier element 2 according to the embodiment example of FIG. 3. However, it is also possible that the luminescence marker 5 in the embodiment example of FIG. 3 is only arranged outside the carrier element 2, for example as shown in FIG. 2, at the carrier element 2. Furthermore, it is also possible that the luminescence marker is both embedded in the carrier element 2 and at the same time applied to an outer side of the carrier element 2.

Figure 4:
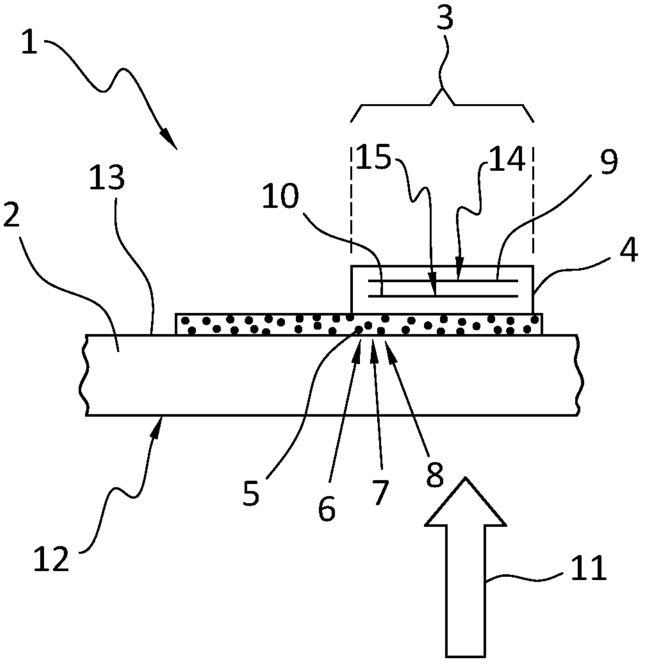
FIG. 4 a schematic diagram of a further embodiment example of the value document, the luminescence marker being arranged on the side of the carrier element facing the foil element.

FIG. 4 shows a further embodiment example of the value document 1 analogous to FIG. 1. However, according to the embodiment example of FIG. 4, the luminescence marker 5 is located on the surface 13 of the carrier element 2 between the foil element 4 and the carrier element 2. In addition, the luminescence marker 5 can also be configured in the carrier element 2.

Figure 5:
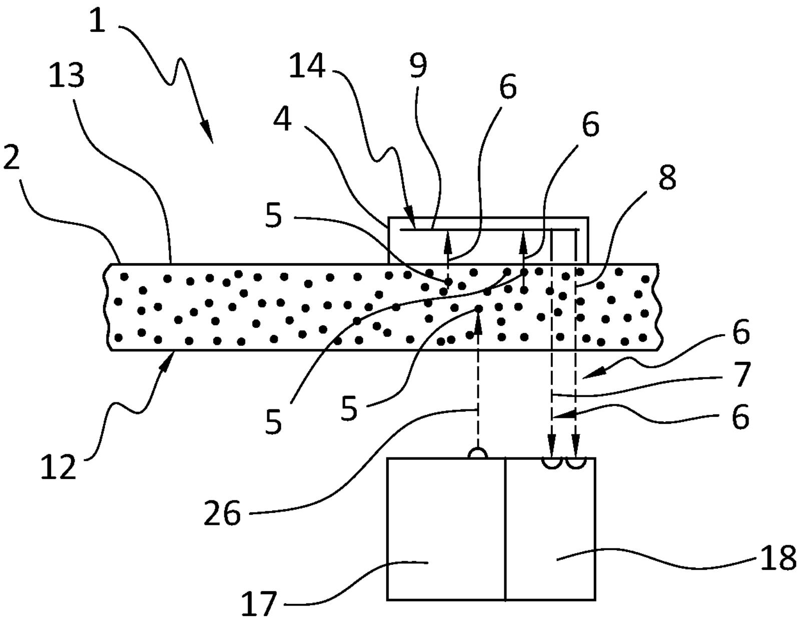
FIG. 5 a schematic diagram of a method for classifying a value document having a carrier element and a foil element.

FIG. 5 shows an embodiment example of a method for classifying the value document 1. An excitation unit 17 is shown, which excites the luminescence marker 5 with excitation radiation 26, for example light. The excited luminescence marker 5 gives off luminescence radiation 6 after the excitation operation. According to the embodiment example, the luminescence radiation 6 is given off at least with the first wavelength 7 and the second wavelength 8.

At least a part of the luminescence radiation 6 impinges on the selection layer 10, which is optionally present in the method and is not shown in the Figure, and is at least partly spectrally inhibited there, i.e. intensities of selected wavelengths of the luminescence radiation 6 are reduced or emerge from the selection layer 10 with less intensity than they enter into the selection layer 10. After the selection layer 10, the at least partly inhibited or with respect to the spectral intensities altered luminescence radiation 6 impinges on the reflection layer 9 and is thrown back from there to the selection layer 10, i.e. is reflected, penetrates the selection layer 10 again, now also penetrates the carrier element 2 and is finally captured outside the carrier element 2, on the facing-away side 12 of the carrier element 2 by a capture unit 18. The capture unit 18 here is configured, for example, as a spectrometer and/or has at least two capture units. Preferably, a first capture unit is configured to capture the first wavelength 7, but not the second wavelength 8, and a second capture unit is configured to capture the second wavelength 8, but not the first wavelength 7. The capture region on the value document 1 is preferably smaller than the extent of the foil element 4. The first capture unit and the second capture unit preferably have substantially the same capture region.

Figure 6:
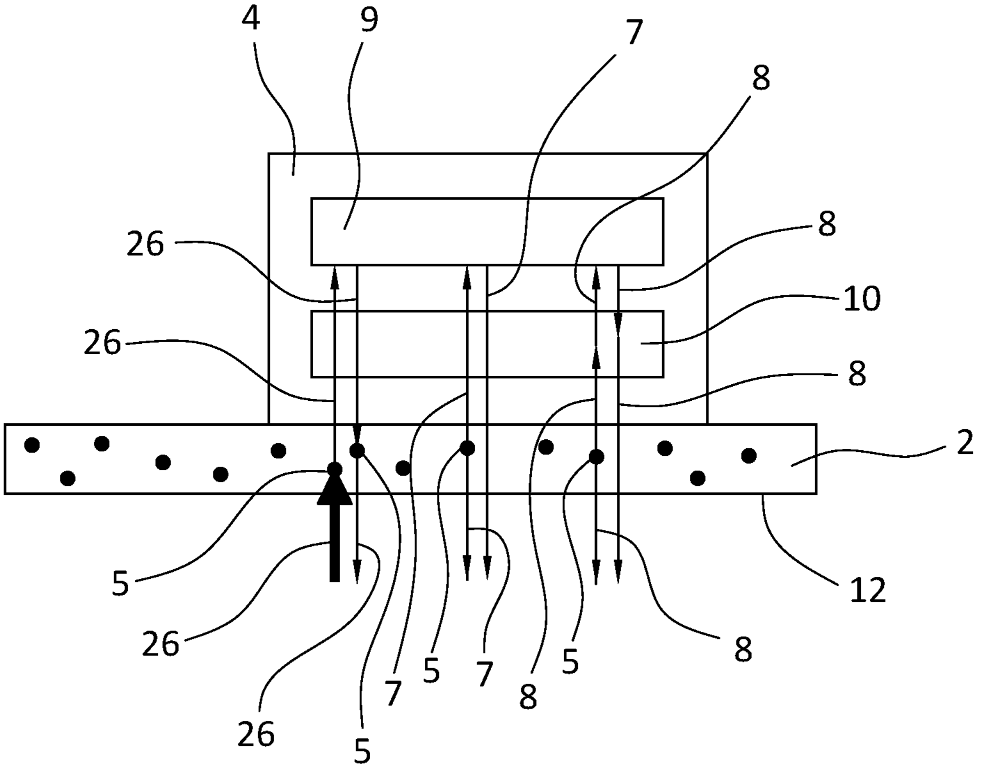
FIG. 6 a schematic diagram of excitation radiation for exciting the luminescence marker and of luminescence radiation given off by the luminescence marker.

FIG. 6 shows a schematic diagram of an embodiment example of the method in which an excitation radiation 26 for exciting the luminescence marker 5 is irradiated in the direction of the carrier element 2. The excitation radiation 26 preferably has only one single wavelength. After excitation of the luminescence marker 5, the excitation radiation 26 continues to radiate with reduced intensity, in the embodiment example penetrates the selection layer 10 and impinges on the reflection layer 9. The excitation radiation 26 is reflected by the reflection layer 9, is radiated again through the selection layer 10 and impinges on the luminescence marker 5 again to excite it anew with decreased intensity. After the re-excitation, the excitation radiation 26 then leaves the carrier element 2 with an again decreased intensity on the side 12 facing away from the foil element 4.

Furthermore, the first wavelength 7 of the luminescence radiation 6 is shown, which is emitted by the luminescence marker 5 after excitation in particular in all spatial directions. The luminescence radiation emitted at the first wavelength 7 in the direction of the foil element penetrates the carrier element 2 and the selection layer 10 substantially uninhibited. Subsequently, the first wavelength 7 is reflected at the reflection layer 9 and again penetrates the selection layer 10 substantially uninhibited. Furthermore, the first wavelength 7 also penetrates the carrier element 2 and can be captured on the side 12 facing away from the foil element 4.

However, the first wavelength 7 radiates in particular in an undirected manner, for the reason of which the first wavelength 7 emerges from the carrier element uninhibited on the facing-away side 12 even without passing through the selection layer 10.

In addition, the second wavelength 8 is also shown, which is also emitted by the luminescence marker 5 after excitation in particular in all spatial directions. The luminescence radiation emitted at the second wavelength 8 in the direction of the foil element penetrates the carrier element 2 uninhibited and impinges on the selection layer 10. According to the embodiment example, the selection layer 10 is configured to inhibit the second wavelength 8, i.e. the second wavelength 8 leaves the selection layer 10 weakened or with less intensity than before entering the selection layer 10. At the reflection layer 9, the second wavelength 8 is also reflected back to the selection layer 10 and passes through the selection layer 10 again, the second wavelength 8 being further diminished when passing through the selection layer 10 again. Subsequently, the second wavelength 8 penetrates the carrier element 2 and leaves it at the facing-away side 12.

The second wavelength 8 also radiates in particular in an undirected manner, for the reason of which the second wavelength 8 emerges from the carrier element uninhibited on the facing-away side 12 even without passing through the selection layer 10.

Figure 7:
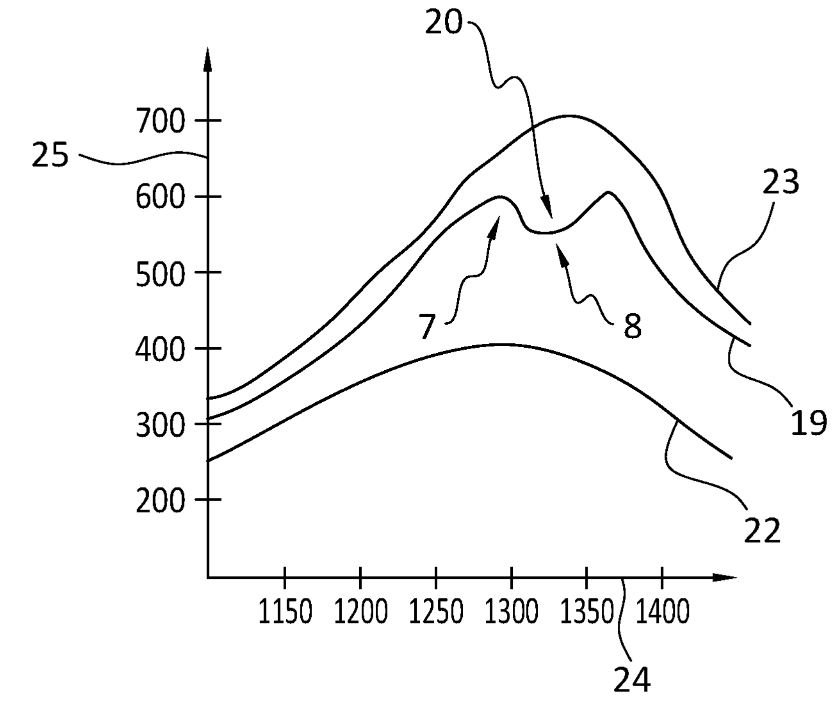
FIG. 7 a schematic diagram of a luminescence spectrum, an absorption spectral region and a spectral signature.

FIG. 7 shows an embodiment example of a document-class-specific spectral signature 19. It can be seen that the spectral signature 19 has a dent 20. The dent 20 arises, for example, at the location of the second wavelength 8. The dent 20 arises by the selection layer 10 inhibiting the intensity of the second wavelengths 8.

Compared to the spectral signature 19, a normal curve 22 and an absorptionless curve 23 are shown. The normal curve 22 arises when the reflection layer 9 is not present and only the direct luminescence radiation of the luminescence marker 5 is captured, for example outside the partial region 3. The absorptionless curve 23 arises when no selection layer 10 is present and thus there is no selective inhibition, but the reflection layer 9 is present, for example in the case of a forged foil element. The dent 20 is then not present in the latter case.

On an abscissa 24 of the diagrams of FIGS. 6 to 11, the wavelength is plotted in nm. On an ordinate 25 of the diagrams, the signal strength is plotted, for example in units of the photocurrent of a photodiode.

Figure 8:
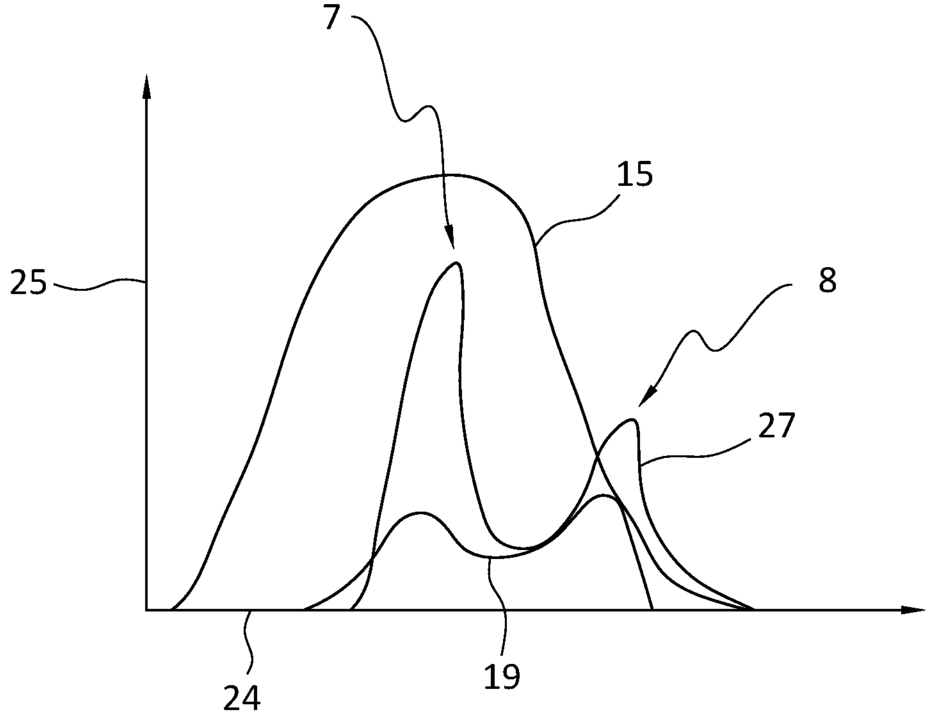
FIG. 8 a further schematic diagram of a luminescence spectrum, an absorption spectral region and a spectral signature.

FIG. 8 shows an embodiment example of a spectral signature 19. The spectral signature 19 is formed by the selection spectral region 15, in particular absorption spectral region or absorption spectrum, and a luminescence spectrum 27 or emission spectrum of the luminescence marker 5. In this embodiment example, the luminescence spectrum 27 has two spectral bands. These spectral bands can, for example, be emitted by two different luminescent substances which together form the luminescence marker 5. The luminescence spectrum 27 may correspond to the normal curve 22 of FIG. 7.

Figure 9:
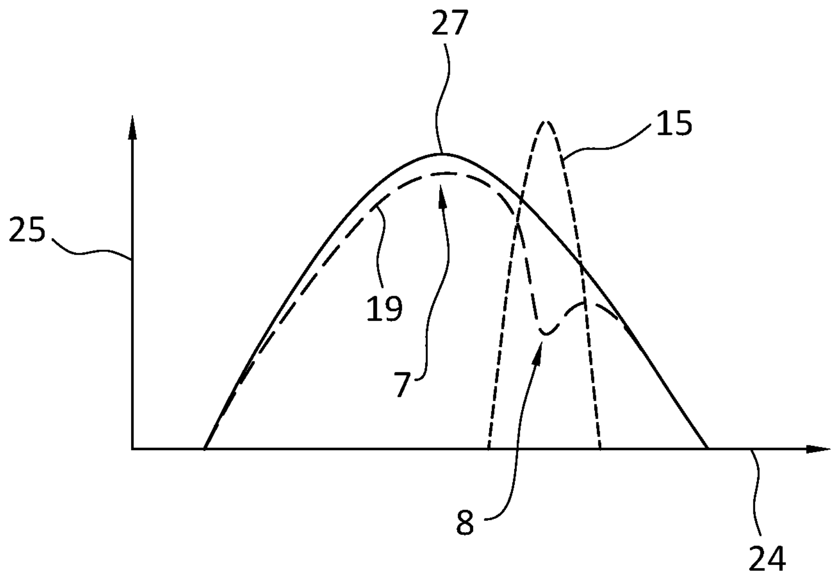
FIG. 9 a schematic diagram of a luminescence spectrum, a selection spectral region configured as a band absorber filter and a spectral signature.

FIG. 9 shows a further embodiment example in a schematic diagram of the spectral signature 19. The spectral signature 19 is formed by the luminescence spectrum 27 and selection spectral region 15 configured in narrow-band fashion.

Figure 10:
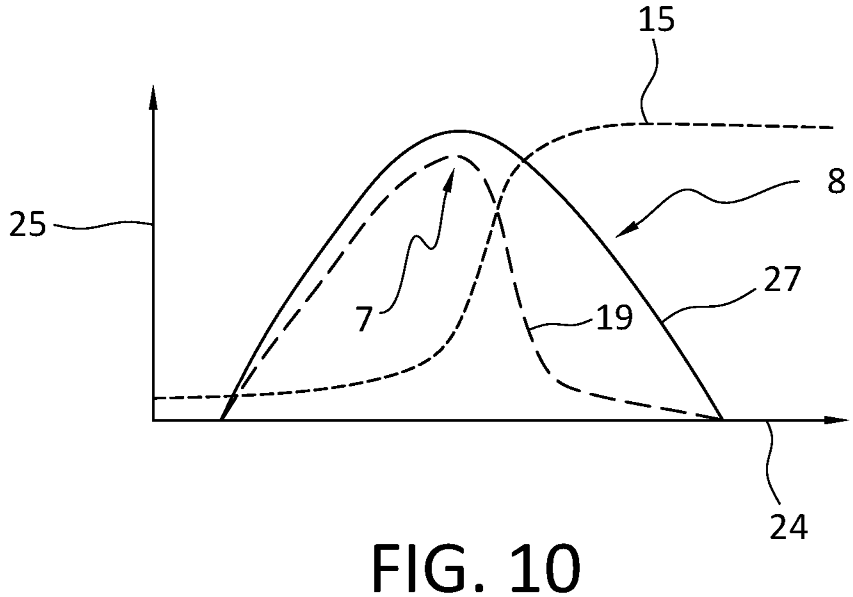
FIG. 10 a schematic diagram of a luminescence spectrum, a selection spectral region configured as a low-pass filter and a spectral signature.

FIG. 10 shows a further embodiment example in a schematic diagram of the spectral signature 19. The spectral signature 19 is formed by the luminescence spectrum 27 and the selection spectral region 15 configured as a low-pass filter.

Figure 11:
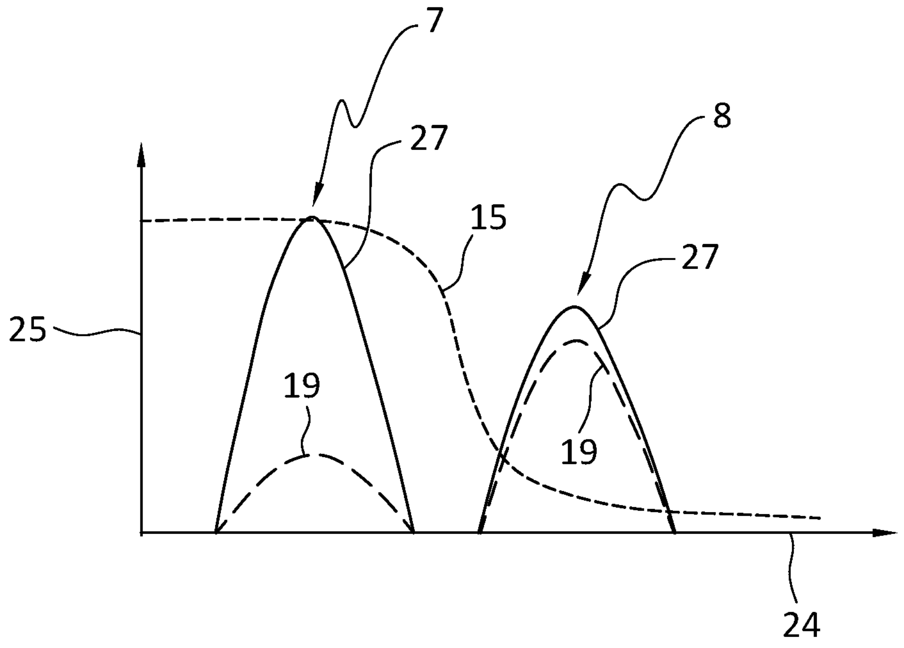
FIG. 11 a schematic diagram of a luminescence spectrum, a selection spectral region configured as a high-pass filter and a spectral signature.

FIG. 11 shows a further embodiment example in a schematic diagram of the spectral signature 19. The spectral signature 19 is formed by the luminescence spectrum 27 and the selection spectral region 15 configured as a high-pass filter.

In another embodiment example, a value document 1 is manufactured. A carrier element 2 made of paper is provided over its full area with a luminescence marker 5 which consists of two luminescent substances which are both excitable at the same wavelength or the same excitation radiation 26, and wherein the first luminescent substance emits luminescence radiation 6 at 1100 nm—corresponding to the first wavelength 7—and the second luminescent substance emits luminescence radiation at 1600 nm—corresponding to the second wavelength 8. To this carrier element 2, a security strip is additionally applied on the front side 13 in a partial region 3 as a foil element 4. The security strip has a visual level 1 feature which consists of a microlens structure with an underlying printed white ink layer. The white ink layer at the same time serves as a reflection layer 9. In addition, the foil element 4 has, underneath the white ink layer, an IR absorber layer as a selection layer 10. In this embodiment example, the IR absorber layer is made of a security printing ink with absorption varying over a broad bandwidth, which at 1100 has an absolute absorption of approx. 50% nm and at 1600 nm an absolute absorption of only 10%. The construction of the value document corresponds to FIG. 1, the spectral ratios to FIG. 11.

The value document 1 is manipulated, for example, by removing the foil element 4 and replacing it with a piece of aluminum foil for a simple impression forgery. The forged foil element differs from the authentic foil element 4 in particular in that it does not have a selection layer 10.

For the authenticity check according to FIG. 5 and FIG. 6, a sensor in remission geometry is used, which in particular has at least one excitation unit 17 and a capture unit 18. The value document 1 is transported past the sensor by a transport device, whereby at least one measurement of the luminescence radiation 6 is carried out by the sensor in the partial region 3, and at least one further measurement of the luminescence radiation 6 is carried out outside the partial region 3. For this purpose, the value document 1 is illuminated with excitation radiation 26 which is adapted to excite both luminescent substances of the luminescence marker 5 to luminescent emission. The luminescence radiation 6 emerging from the backside 12 of the value document 1 is captured by the capture unit 18, a first capture unit capturing only the luminescence intensity at 1100 nm and a second capture unit capturing only the luminescence intensity at 1600 nm. When viewed from the sensor behind the document transported past, there is a broadband-absorbing, for example black, area.

By the presence of the luminescence radiation 6 at the first wavelength 7, in particular 1100 nm, and at the second wavelength 8, in particular 1600 nm, the authenticity of the carrier element 2 is proven. The captured intensities of the luminescence radiation 6 at the first wavelength 7 and the second wavelength 8 are in particular in a fixed ratio characteristic for the luminescence marker 5, which ratio is ascertained in the measurement outside the partial region 3 or is measured there (luminescence spectrum 27 in FIG. 11). In the present embodiment example, this ratio is preferably 1.0.

In the measurements in the partial region 3, the luminescence intensities or intensities measured are significantly higher due to the influence of the reflection layer 9 of the foil element 4. For example, in the presence of a foil element with a reflection layer 9, the measured intensities at the wavelengths 7 and 8 are increased by about 50%.

If the foil element has the IR absorber layer 10 characteristic of an authentic foil element 4, the measured intensity at the first wavelength 7, in particular 1100 nm, is, due to the interaction with this selection layer, however about 10% lower than at the second wavelength 8, in particular 1600 nm, which is in particular characteristic of the spectral signature 19. The authenticity of the foil element 4 can thus be checked on the basis of the measured ratio between the luminescence intensity at the first wavelength 7 and the luminescence intensity at the second wavelength 8. As a decision criterion, the difference in intensity ratios outside partial region 3 and in the partial region 3 is used. If the measured intensity ratio in the partial region 3 is, for example, more than 0.07 smaller than outside the partial region 3, the existence and the authenticity of the foil element 4 is considered confirmed, otherwise the checked value document 1 is rejected.

The invention claimed is:

1. A value document with a carrier element and a foil element arranged in a partial region of the carrier element,
- wherein the carrier element has, at least in the partial region, a luminescence marker which is adapted to give off luminescence radiation which has at least a first wavelength and a second wavelength in each case in the infrared spectral region, and
- wherein the foil element has a reflection layer and a spectral selection layer,
- wherein the selection layer is arranged between the carrier element and the reflection layer,
- wherein the reflection layer is configured to reflect infrared radiation and the selection layer is configured to spectrally selectively inhibit transmission of infrared radiation,
- wherein the inhibition of the transmission of the first wavelength and the inhibition of the transmission of the second wavelength differ by at least 10%.

2. The value document according to claim 1, wherein the foil element is configured as a security element constructed in layered fashion.

3. The value document according to claim 1, wherein the foil element is configured as a patch and/or hologram and/or security thread and/or security strip.

4. The value document according to claim 1, wherein the foil element is applied to a surface of the carrier element.

5. The value document according to claim 1, wherein the reflection layer and the selection layer are configured to overlap when viewed perpendicular to the carrier element.

6. The value document according to claim 1, wherein the selection layer is configured as an absorption layer.

7. The value document according to claim 1, wherein the reflection layer has a reflection spectral region, and the selection layer has a selection spectral region,
- wherein the reflection spectral region is more broadband than the selection spectral region.

8. The value document according to claim 1, wherein the reflection layer is adapted to reflect at least 50% of a luminescence radiation irradiated by the luminescence marker and incident on the reflection layer.

9. The value document according to claim 1, wherein the luminescence marker is embedded in the carrier element.

10. The value document according to claim 1, wherein the value document has a document-class-specific spectral signature which is dependent on a luminescence radiation irradiated by the luminescence marker and incident on the selection layer.

11. A method for classifying a value document with a carrier element having a luminescence marker and a foil element arranged in a partial region of the carrier element and having a reflection layer, in which the following steps are performed:
- a) exciting the luminescence marker with radiation from an excitation side of the value document, the excitation side being the side of the value document facing away from the foil element;
- b) capturing an intensity of the infrared luminescence radiation irradiated by the excited luminescence marker and reflected by the reflection layer;
- c) comparing the captured intensity with a reference intensity; and
- d) classifying the value document based on the comparison;
- wherein the luminescence radiation irradiated by the excited luminescence marker is spectrally inhibited by a selection layer of the foil element before the capture in step b.

12. The method according to claim 11, wherein as the captured intensity, at least a first intensity of a first wavelength and a second intensity of a second wavelength each in the infrared spectral region are captured.

13. The method according to claim 11, wherein a direct luminescence intensity of the luminescence marker outside the partial region is captured on the direct way of propagation, and in step d) the classification is performed based on the direct luminescence intensity and the intensity captured in step b).

14. The method according to claim 11, wherein the reference intensity is made available by a direct luminescence intensity of the luminescence marker captured outside the partial region and on the direct way of propagation.

* * * * *